United States Patent

[11] 3,543,694

| [72] | Inventors | Pierre Jean Clement Tanguy;<br>Pierre Robert Carre; Jean Andre Le<br>Boulbouech, 2 rue Bodelio, Lorient, France |
|---|---|---|
| [21] | Appl. No. | 681,549 |
| [22] | Filed | Nov. 8, 1967 |
| [45] | Patented | Dec. 1, 1970 |
| [32] | Priority | Nov. 10, 1966, June 7, 1967 |
| [33] | | France |
| [31] | | Nos. 2261, 2320, 2321 and 2322 |

[54] MACHINE FOR MAKING ELONGATED COOKED FLAT FOOD PRODUCTS
19 Claims, 20 Drawing Figs.

[52] U.S. Cl..................................................... 107/4,
107/8
[51] Int. Cl........................................................ A21b 1/44,
A21b 5/02
[50] Field of Search........................................... 107/4.45, 4,
8

[56] References Cited
UNITED STATES PATENTS
1,471,727  10/1923  Gomez.
2,899,914  8/1959  Van Arsdell.
3,349,724  10/1967  Tavan.

*Primary Examiner*—William I. Price
*Assistant Examiner*—Robert I. Smith
*Attorneys*—Robert E. Burns and Emmanuel J. Lobato ABSTRACT: Machine for making flat cooked food products of any shape such as pancakes, in which there are provided a dough dispensing device movable relative to a device for feeding dough in which the level of the dough is maintained fixed, a cooking device movable relative to the dough dispensing device in such a way that owing to its relative movements, the dough dispensing device dispenses dough on the cooking device in the desired shape.

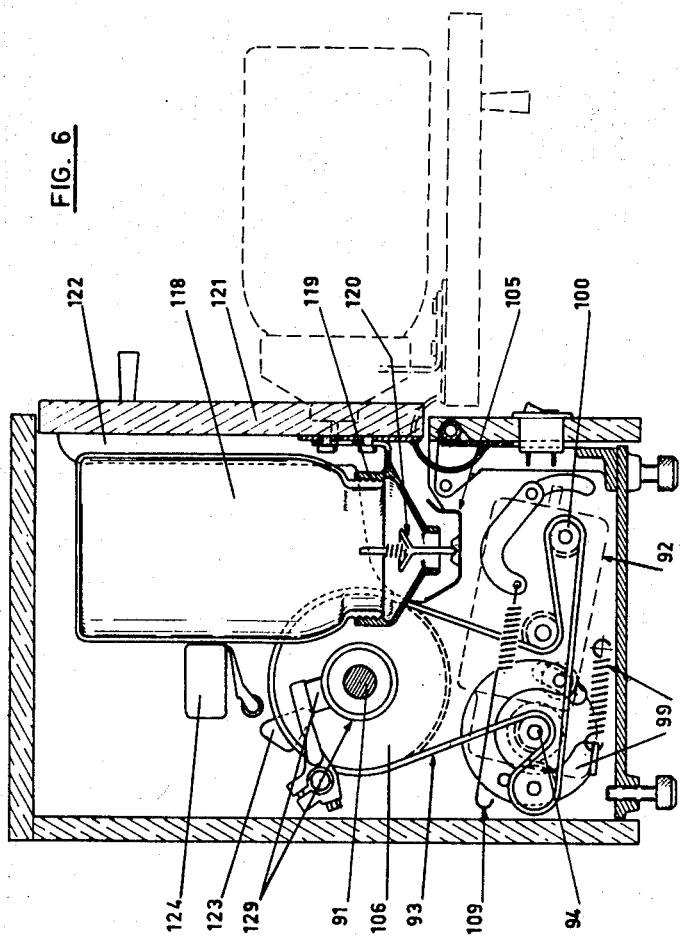

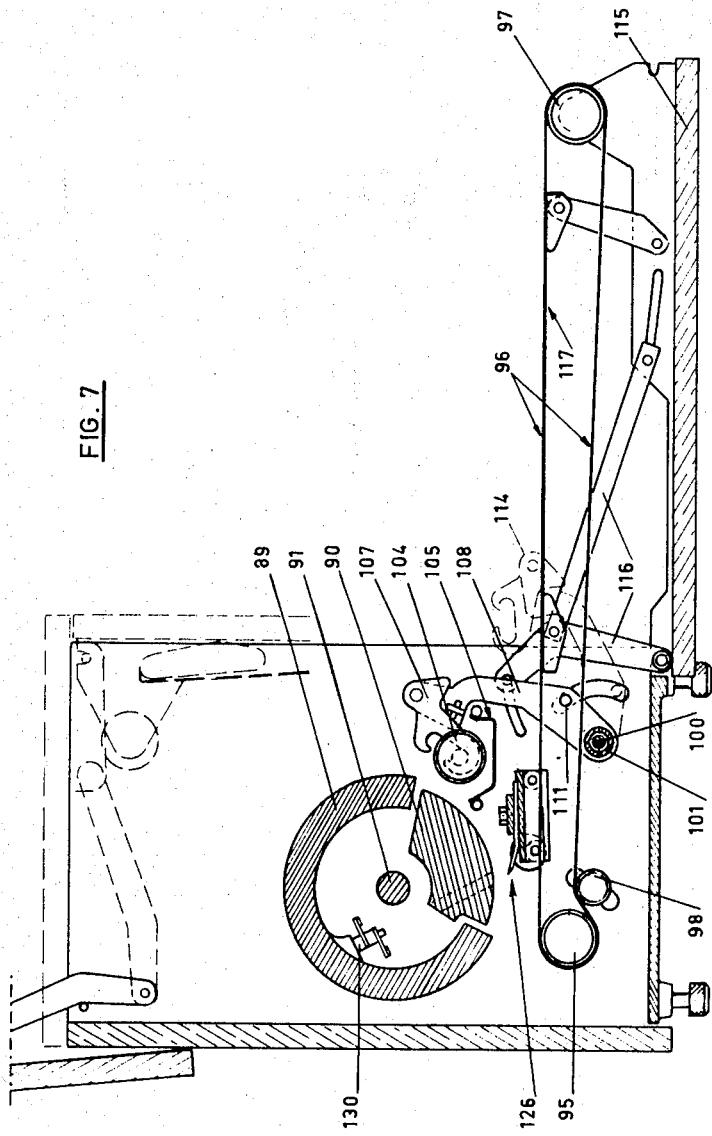

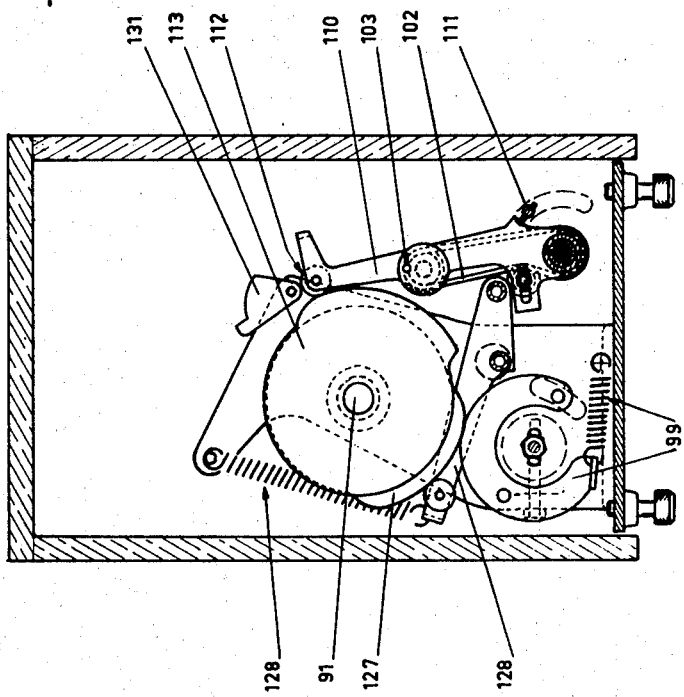

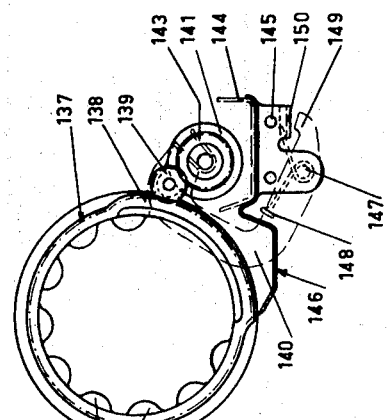
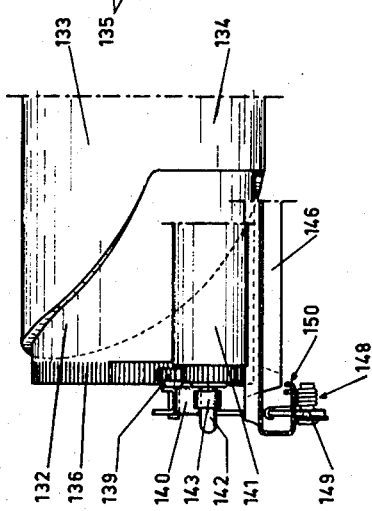

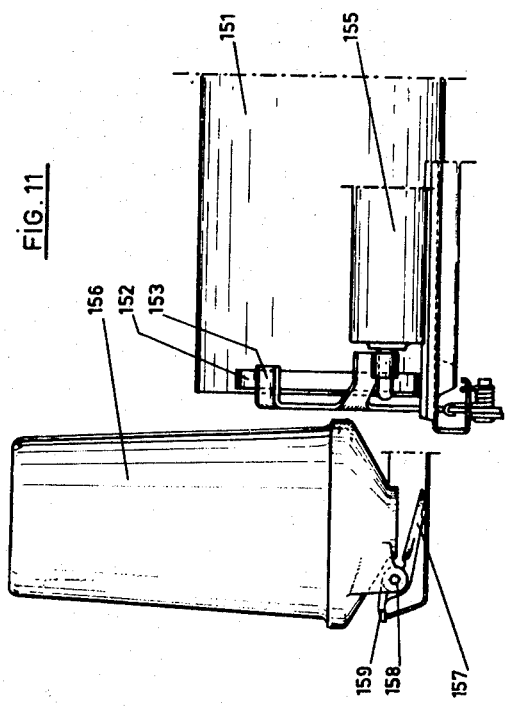
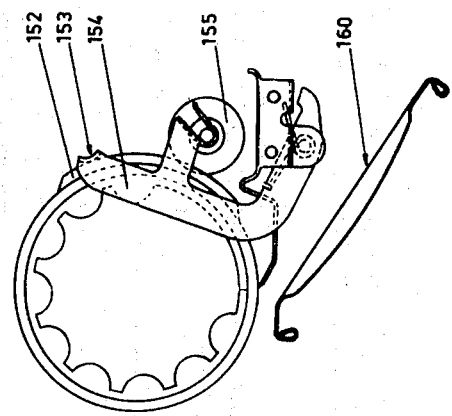

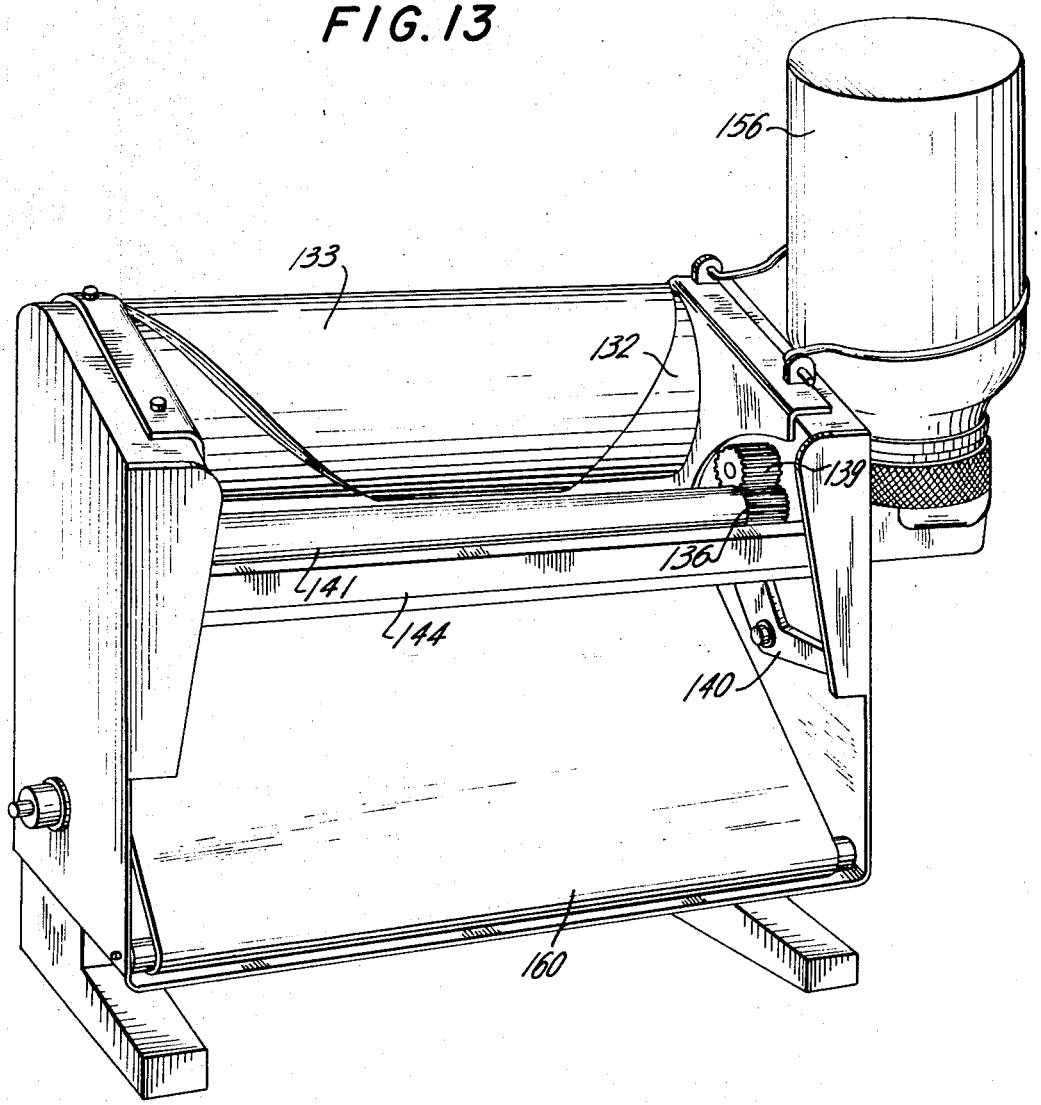

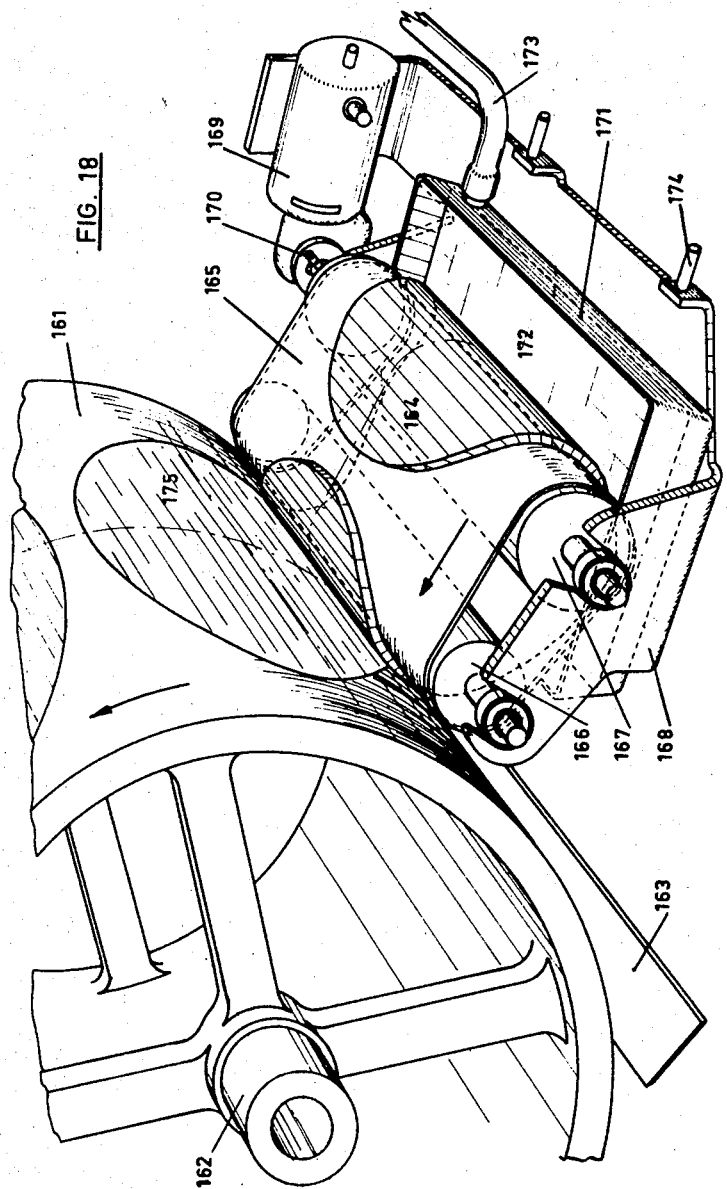

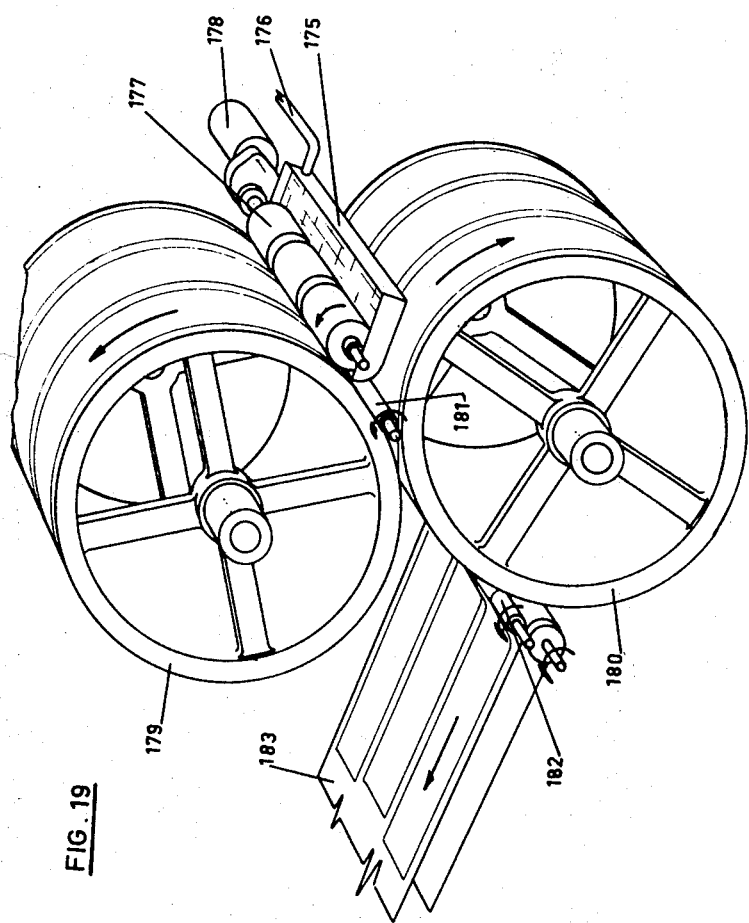

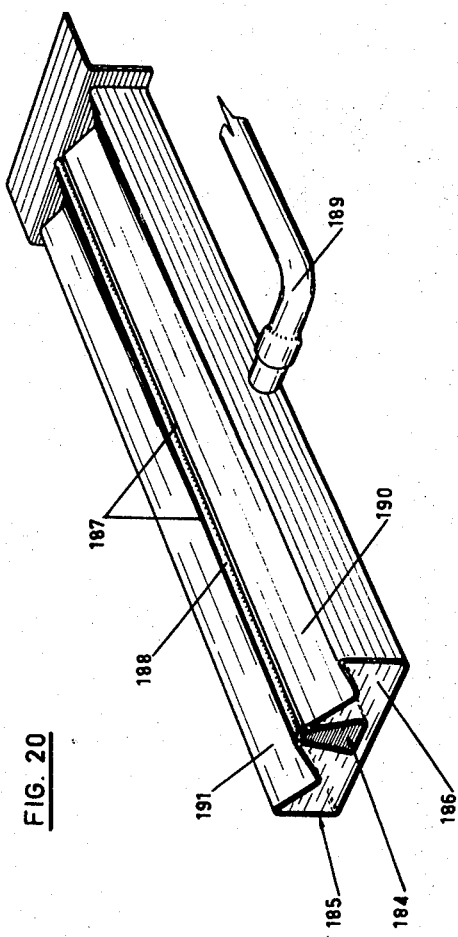

MACHINE FOR MAKING ELONGATED COOKED FLAT FOOD PRODUCTS

The present invention has for its object a machine for making products like pancakes made of any material such as wheat, buckwheat or other cereals and in any shape, squared, round or others, cooked on one or two sides, the said machine being of industrial, artisanal or household dimensions.

It is known that the manufacture of pancakes consists in placing a more or less thick layer of dough on a hot plate and after a certain cooking time turning (or not) the same to complete cooking on its other side. The spreading of the dough constitutes the delicate part of the operation and to obtain the thickness required in certain places, of the order of three-tenths to four-tenths of a millimeter, takes a great deal of experience. Spreading generally takes place with the aid of a small wooden scraper on a cast iron hot plate. The present machine automatises these steps.

In order to make, and to obtain good functioning of the present machine it suffices:

1. to have a container of dough the level of which is maintained substantially constant by any suitable well-known means.
2. to cause to rotationally dip therein:
   a. either a cylinder having a uniform surface,
   b. a travelling belt having a raised contour corresponding to the shape of the pancake to be obtained,
   c. or to use directly the level of paste emerging from the dough container.

The shape of the pancake obtained depends essentially:
   a. for a cylindrical smooth or a lipped paster or paste dispenser on the shape of the hot plate;
   b. for a paster with a belt on the raised surface of shaping means forming an integral part of said belt.

The machine can be designed so that the paster does not rotate in the case of a paster having a lip, which remains immobile while the cooking surface can move in any desired direction.

After a certain waiting time for cooking the pancake thus formed, time obtained either by the temporary immobilization of the cooking plate, either by the residence time of the pancake on the plate or the cylinder during its rotation, the deposit of cooked or partially cooked dough is then scraped by means of a blade rubbing on the cooking surface.

The said scraping takes place possibly in the lower part of the cylinder generated by the incurved plates or of the cooking cylinder.

The pancakes formed on these latters are allowed to deposit either on the rotating heating plate or on the travelling belt.

The invention will be better understood by reading the following description given by way of nonlimiting example, reference being made to the accompanying drawing in which there is first seen:

FIG. 1 a cross-sectional view through the longitudinal axis of the machine, the flat plate being in waiting position.

FIG. 2 underneath view with flange cut at different heights of the flat plate in half cross section, with the scraper removed.

FIG. 3 cross-sectional view at a level permitting to see the pawl device of the rotor with the flat plate withdrawn during automatic operation.

FIG. 4 cross-sectional view at a level permitting to see the driving of the rotor with the flat plate withdrawn in "stuffing" position.

FIG. 5: shows a perspective of the machine in an open position, on the left there is located the motor compartment on the right the cam compartment.

FIG. 6: shows a cross-sectional view of the motor compartment and of the reservoir.

FIG. 7: shows a cross section through the longitudinal axis of the machine.

FIG. 8: shows a cross-sectional view of the cam compartment.

FIG. 9: shows a partial front view and FIG. 10 a cross-sectional view of the elements of a machine for direct meshing and movement of the pasting roller for a round pancake.

FIG. 11: shows a partial front view with a view of a dough reservoir equipped with a door and FIG. 12 shows in cross section the elements of a machine with independent drive of the pasting roller and movement by actuation of a roller on a boss of the rotor for square pancakes.

FIG. 13: shows a perspective view of a household machine embodying the principles exemplified by FIGS. 9 and 10.

To make an artisan-size machine for cooking a pancake on its two sides, the invention puts into operation a set of rounded and incurved heating plates (called rotor plates) fed with dough by a paster-roller. A movable flat plate ensures the second cooking and a "stuffing" device permits the culinary finishing of the pancake.

As will be realized later the various FIGS. do not show all details, in particular the return springs, the stops, certain shafts, and fastening means for the electric components.

Considering in FIG. 1 the paster device, it is seen that the dough container 1 in which the dough level is maintained constant by floats 2, is supplied with dough through a flexible tube connecting tube 3 and opening 4 of reservoir 5.

Floats are mounted in such a way that their armature closes the lower opening of tube 3. The paste roller 6, driven by coupling through handle 7 in FIG. 2 of the set of pulleys 8, belt 9, return pulleys 10, motor pinion 11, which depends itself on the reducing motor block 12, dips in a dough contained in container 1. Its direction of rotation is indicated by arrow 13.

The assembly of the container and the paste roller is positioned on plate 14 in grooves made therein in order that disassembly be facilitated. This plate 14 can move on upright 15 in order to approach or come away from the assembly of the rotor plates. These movements are produced by links 16, lever 17, lever 18, provided with roller 19, which bears against cam 20.

A second lever 21 is rigid with shaft 22.

Movement towards the left (relative to the drawing) is limited by the action of the adjusting screw rigid with plate 14 and coming to stop against upright 15, (this detail is not shown on the drawings). A pivoted cog 23 (FIG. 3) manually operated can retain lever 18 in its withdrawn position.

The device for the first cooking of the pancakes (FIG. 2) comprises plates 24 and 25, having a shape such that their surfaces inscribe themselves in a cylinder having a circular base and that their involution be a circle, these being electrically heated by resistances incorporated therein and fed by collector rings. They are rigid with shaft 26 owing to the bolting of fork 27. They have a beak 28 overlapping their circular periphery.

Shaft 26 turns freely in flanges 29 and 30 through ball bearings 31 and 32. This shaft also drives different cams:

Two scraping cams 33 and 34 (FIG. 2) on which rest roller 35 rigid with lever 36 forming part of the transversal blade carrier 37 on which is secured scraping blade 38. A lever is downwardly urged by a spring (not shown).

Cam 33 has a smaller "stuffing" cam 40 on which can rest roller 41 integral with tripper 42, itself pivoted on the large lever 43 at point 44. This large lever pivoted at 45 on upright 15 has a shoe 46. Tripper 42 is actuated by a rod 47 the extremity of which emerges from the machine by passing through the cover at point 48 (FIG. 2).

By pulling the rod the "stuffing" cam 40 is placed outside the range of roller 41 while by pushing the rod, roller 41 comes to rest on "stuffing" cam 40 when the same passes thus actuating the large lever 45 as shown in FIG. 4.

Cam 20 the pasting functions of which have been previously analyzed and which bears additionally two rollers 49 and 50 (FIG. 3).

Grooved pulley 51 (FIG. 4) flanked by grooved pulley 52 rigid one with the other and having shaft 53 (FIG. 3), for the rest of the description referring to this paragraph, on which is pivoted a pawl 54.

This pawl is permanently urged counterclockwise relative to the drawing by a spring (not shown) secured at the extremity of arm 55. At one of its extremities a roller 56 can rest on fixed cam 57 secured at 58 and 59 to flanks 30. At the other end of this pawl a channel 60 can come to bear on one of the rollers 49 or 50.

This pulley 51 freely turns on shaft 26 (FIG. 4 for the description referring to this paragraph) and is moved counterclockwise by the action of the cable 60 returned by the set of pulleys 61, 62, 63 and 64 and secured to the device for moving the flat plate the description of which will be given later.

Pulley 52 rigid with pulley 51 urges the latter clockwise through the action of cable 65 returned on pulley 66 and pulled by a spring not shown.

The device for the second cooking (FIG. 1) comprises flat plate 67 which is secured on two crosspieces 68 and 69. This plate is heated by means of electrical resistances incorporated therein. Crosspieces 68 and 69 have trunnions 70 on which freely turn rollers 71. These rollers travel along rails 72 secured to crosspieces 73 and 74, themselves secured to flanges 29 and 30. Height-adjustable screw jacks 75 ensure the stability of the machine.

The flat plate movable along rails 72 is moved by a roller 76 forming an integral part of barrette 77 connected to one of the links of chains 78 and 79.

Between rollers 76 and barrette 77 is interposed the end cable socket of cable 60 above mentioned.

This socket thus will follow all movements of roller 76.

Movements towards the right (still relative to the drawing) are due to the pressure of roller 76 on crosspiece 68.

Movements towards the left are ensured by the pusher of said roller against counter crosspiece 80, connected to crosspiece 68, through arms 81 and shaft 82.

A roller 83, integral with the assembly of the flat plate, bears on lever 21, when said assembly is in its extreme right position.

This counter crosspiece 80 can be raised according to the detail on FIG. 4 when it rests against shoe 46 through roller 84. FIG. 2 shows the assembly of the counter crosspiece, arm, roller, shaft as well as bar 85 intended to maintain the counter crosspiece on a level with the roller when it is not acted upon by the shoe.

Movement of the chains 78 and 79 is ensured by meshing on pinions 86 and braces 87 and 88. Pinion 86 is itself driven by wheel 89 the movement of which is transmitted to motor pinion 90 by chain 91.

Container 5 is protected from the heat of rotor plate 24 and 25 and plane 67 by insulation 92 (FIG. 1). A folding hood 93 protects it from dust.

Cams, levers and collecting rings are hidden under foldable hoods the outer appearance of which is designated by 94 (FIG. 1).

In front of the machine a breast plate 95 supports the electrical apparatus for regulating the temperature, the timing of the cooking time, the servo contacts, the sighting switch and the switches necessary for the good functioning of the machine.

External metal sheets 96 hide the mechanical parts.

The automatic functioning of the described machine is the following:

The different plates 24, 25 and 67 being at suitable temperatures, the pasting roller 6, splashing in the pancake dough contained in the reservoir 1, the plate 67, being in waiting position according to FIG. 1 motor 12 is started. The chain driving roller 76 pulls cable 60 which through pulley 51 and pawl 54 puts in operation cam 20, and the assembly of plates 24, 25 and flat plate 67.

Plate 25 passes before pasting roller 6 which is adjusted at a movable distance therefrom and deposits thereon a layer of dough.

This layer of dough will be all the thicker as the speed ratio obtained by the set of pulleys 8 will be greater.

Rotor plate 25 continues on its path up to the position previously occupied by plate 24.

During this half-rotation of the rotor block, roller 56 of pawl 54 comes into contact on fixed cam 57 and frees itself from roller 50 which is held in its channel 60. The pawl passes beyond the roller and reaches the position represented (FIG. 3) when the roller 76 has reached the extreme position between pinions 87 and 88.

The block remains in this position because of the support of rollers 35 in the bottom of the curve of cams 33, 34.

Arrived in the extreme position described above and shown in FIGS. 2 and 3, an electric contact stops motor 12 and stops a timer.

The adjusting time of the timer gives the cutting time of the shaped pancake.

Upon a triggering of the timer, the motor is rotated at a speed greater than the previous one in order to ensure the rapid return of flat plate 67 which is driven in this movement by counter crosspiece 80.

During this return, cable 65, urged by a return spring, makes free pulley 51 return to its starting point. This pawl, forced by cam 57, passes around roller 50, as before but in the other direction and continuing its rotation places itself beyond roller 49. At this point, roller 76, has reached its starting position represented on FIG. 1.

An electric contact in the circuit of chains 78 and 79 reduces the speed of the motor. Roller 76 again drives plate 67 and the rotor block.

The pancake cooking on 25, (now located in the place of 24) comes to occupy the original position while the pancake forms thereat by passing in front of pasting roller 6.

At the start of this rotation, rollers 35, pushed back by cam 33 and 34 have disengaged the cutting part of scraper 38 from the path travelled by the surface of the rotor plates, and then allowed this cutting part to rest on the beak of the plate 25 and have freed the spring which will urge the transversal blade holder 37.

The cutting part of blade 38 in contact with the rotor plate unsticks the pancake and allows it to fall progressively on the flat plate which is in the process of moving in the same direction thus bringing, at the end of its travel, the pancake outside of the machine.

The pancake thus handled can remain for a second cooking for a time less than that set by the timer.

At worst the operator must remove the pancake when the flat plate starts to reengage in the machine.

Before the pasting operation, lever 18, rests on cam 20. During rotation of the rotor plates, the surface of cam 20 slips aside and levers 17 and 18, urged by a spring, towards plate 14 and the paster block towards the rotor block. Step screws stop the latter at a suitable distance. The placing in contact of the paste with the rotor plate is achieved in such manner that the beak thereof not be coated with paste in order that scraper 38 come to rest in front of the layer of dough. Lever 18 is once again pushed back by cam 20 as soon as the rotor plate has been completely covered with dough.

It should be noted that the timer must be adjusted to a time which is half as less as that of the real time of the first cooking (less the time for the turning of the flat plate). This time is thus in fact the maximum time possible for the second cooking (less the time for the return of the flat plate).

Automatic position in "stuffing" rate is the following:

The passing to the automatic stuffing rate takes place by pushing the rod which causes the tripper to pivot. A single plate serves for the stuffing rate. The other can remain fed in electrical current if the stuffing operation takes place only occasionally or can be cut if the stuffing rate is permanent.

The operations occur in the same manner except that as soon as a pancake has been formed on the rotor plate in operation (plate 24), the stuffing cam pushes back roller 41, tips large lever 43 and raises shoe 46. Flat plate 67, when it arrives at the end of its external path, will engage roller 83 on said shoe 46 and will not be able to depart therefrom, roller 76, passing under the countercrossbeam.

Roller 76, during its circuit around pinions 86, 87 and 88, will drive the plates by a half rotation bringing plate 24 in front of the scraper and putting stuffing cam 40 out of action. Further, lever 21, bearing against roller 83, will prevent arm 18 and roller 19 from following the contour of paster cam 20. The dough container 1 will remain away from the rotor and no pancake will be formed on plate 25 upon return of pinion 37, roller 78 will pass under the countercrosspiece 80, (the same having a cog or notch provided for this purpose) and drive again the assembly of the flat plate as soon as it leaves 88 towards 86.

During this automatic stuffing operation, the stuffing time is equal to the time of cooking the first surface (less the two times for the return of roller 76).

The waiting time can be the same as that for the automatic operation. In effect, the dough for pancakes intended to be carried away (automatic operation) is different from a dough for pancakes to be eaten on the premises (stuffing operation), the time of cooking being accordingly different.

By maneuvering the switch for the complete stop of the machine, it will be possible to prolong slightly the time of the laborious stuffing.

The operation in a "controlled stuffing operation" is the following:

In the case of culinary preparations longer than a simple spreading of stuffing (example: scrambled eggs cooked on the pancake), it is necessary that no pancake be in the process of cooking on the rotor plate.

In this particular case, the operator must engage cog 23 in order to retain lever 18 which accordingly will prevent the paster roller from forming a pancake upon passage of the rotor plate in use.

This cog is coupled to a switch which by combination with a second switch associated in the clearance of lever 43 permits the rotor to continue its rotation without times stop and to stop in such a way that the rotor plate in service ready to be again supplied with dough.

The disengagement of cog 23 puts the machine into operation again either in automatic if the lever connected to tripper 42 is pulled or in a "controlled stuffing operation" if cog 23 is pushed back as soon as a pancake is formed.

The application of the invention for making a machine for artisans for simple cooking, puts in operation a single round incurved plate (rotor plate) rotationally driven to the extent of one rotation per cycle and fed with dough by a pasting roller dipping in a container fed by an inverted vessel. The pancake is deposited on a withdrawal rolling belt connected directly with the rotating rotor plate permitting to remove, fold or add to the pancake while another pancake is spread out and cooks on the rotor plate. The assembly of parts is made in a compact form capable of fitting in a moulded or wooden receptacle.

The rotor plate the shape of which has not been defined in the following description (but which is shown as round in the drawings) can be:

a. either round as required by the definition of the word "pancake", b. or square or rectangular which shapes do not correspond with that of the conventional pancake, but which owing to the ease of construction of the rotor plate, constitute shapes resulting in substantial economy in the manufacturing price of the apparatus, c. any shape whatever and having a design in relief which alone will be covered with dough. This relief can assume any desired geometric shape (round, rectangular, shield, clover, heart, spade, stylized shapes of animals) and this if the name pancake is applied to shapes other than round; and d. either a given shape provided with two or more twin designs in relief, either a generatrix of a cylinder, or on a right section of said cylinder.

The rotor comprising the incurved plate 89 and a counterweight 90 both secured on shaft 91 are rotated by motor 92 (shown taken away) through chain 93. The latter moves shaft 94 coupled to roller 95 driving carpet 96 through springs and rods 99. The chain moves shaft 100 passing through the machine from one end to the other in tube 101, and through a set of pinions and chains 102 transmits movement to handle 103 itself driving the pasting roller 104 bathing in vat 105. The chain moves shaft 91 of the rotor through crown 106.

The pasting roller 104 is supported by open bearings 107 pivoted on arm 108 secured at their base to tube 101.

On the side of the motor the assembly is subjected to the pressure of spring 109. On the side of the cams, this stress is transmitted to lever 110 through pur 111. This rod urges roller 112 against the spreading cam 113. When it is desired to remove the pasting roller 104, arm 108 is tipped over in position 114. In this position it is also possible to take out vat 105. The replacement takes place as easily.

Rolling helt 96 is stressed by end roller 97 when the folding door 115 is open. This latter remains in a horizontal position owing to the set of rods 116, which also supports at the same time table 117. When the door is raised, the assembly is applied against the inner face of the flank 115.

The dough reservoir 118 provided with a special spigot 119, closed in horizontal position or head high by the valve 120 is placed on folding door 121 by means of a button type lock. When the door is closed the rod of valve 120 comes to rest on the bottom of vat 105, and the opening of spigot 119 is open. Dough fills the vat until its level reaches the edge of the spigot. At that moment air no longer can enter inside of reservoir 118 and the flow stops to resume again as soon as the level has become lowered, a certain quantity of air being able to penetrate in the reservoir. Valve 120 being urged by a spring it is possible to open the door at any moment without loss of dough from the reservoir. A light 122 on the wall separating the motor from the rotor makes possible observing the level of dough remaining.

When rotor 89 has made one rotation and roller 104 has spread dough on its surface, cam 123 acts on contact 124 which cuts off the motor and starts timer 125. The latter will again close the supply circuit of the motor after the lapse of time for which it has been set, time corresponding to the cooking time of the pancake formed on the rotor. A new spreading of dough will take place during which scraper 126 will remove the first pancake and will let it fall progressively on carpet 96, the latter bringing the pancake out of the machine. The scraper is urged by cam 127 and through lever and spring 128. The electric current is transmitted to the rotor by a set of rings and brushes 129 and its feed is controlled by a contact thermostat 130 which can be occasionally adjusted through a hole made in the counter weight. In order to stop the pasting action of the machine in order to take the last pancake spread out, arm 110 can be pushed back by lowering small cam 131.

To make a household size machine, the invention comprises a cylindrical rotor on which the shape of the pancake is engraved in relief, the two extremities of this shape being mutually connected by a raised surface of the same height in relief in order that in the central zone of the cylinder there by no level lost. This arrangement permits to scrape the pancake by means of a blade bearing permanently on the rotor while the spreading of dough takes place on the round shape.

To cut manufacturing costs, the unsticking or removal of the pancake is manual through the handling of an electrical switch by the operator observing the cooking state of the pancake. An inclined plane withdraws the cooked pancake.

To simplify the making of the rotor the same can be smooth and without a raised surface, the pancake being in this case square.

Cylinder 132 has a raised part 133, in the form of a disk wound on said s cylinder and the two extremities of which are connected by a raised surface 134 giving to the assembly of the raised surface thus formed a continuous surface. This cylinder is partially heated by clad electrical resistances molded therein and contained in bosses represented by 135. They are located perpendicular to the useful surface corresponding to the previously mentioned disk. Each edge of the cylinders has teeth 136. This cross section has a flap 138 bearing against and meshing with free pinion 139, keyed on arm 140 which itself supports the paster roller 141, equipped with teeth 142 at each of its extremities. The trunnions of the pasting roller stand in the bottom of a fork 143 in order that the same be instantaneously removable. It dips in the vat 144 (not shown on FIG. 9) which also can be removed easily and which rests on the U-shaped section secured to the frame of the machine by rivets 145.

This U-shaped section is formed by suitable folding of scraper 145, which owing to this fact bears permanently against the working surface of the rotor. The steel stamped scraper has at each extremity a bend on which are secured at 147 the end of arms 140. These arms are permanently urged by springs 148 applying free pinion 139 against teeth 136. To limit the movement of these arms and accordingly obtain a constant distance between the shape to be covered with dough and the pasting roller, the extremity 149 of arm 140, comes to rest against the bends of sheet 150.

In inoperative position, the rotor is as shown in FIGS. 9 and 10; free pinion 139 keeps the pasting roller 141 away from the surface of the rotor and the scraper contacts the end of raised surface 134. Upon the start of rotation, the scraper rubs against raised surface 133 and removes therefrom the cooked dough, if a pancake had been on it before. After a certain angle of rotation, free pinion 139 following teeth 136 moves towards the axis of rotation of the rotor and allows the pasting roller to approach raised surface 133. Coating with dough occurs only on raised surface 133. The shape of the pancake is thus a disk slightly cut by two parallel secants. Upon rotation of the rotor, the roller covers itself with dough contained in vat 144 and the distance covered in order to start the covering with dough permits to the roller to cover itself entirely with dough. The rotor through the intervention of an electric contact stops after a complete rotation and can be started anew only manually.

Rotor 151 of cylindrical shape has at each side a boss 152 positioned in such a way that shoes 153 rigid with arms 154 bear thereagainst and move away the pasting roller 155, the pasting roller is in this case driven independently of the rotor by a transmission system not shown. The length of the pasting roller 155 is shorter than the distance separating the two bosses 152 while the scraper has a sharp member of intermediate width in order that without hurting against the bosses, it removes the entire band of spread dough. Owing to the position of bosses 152, the pancake is formed perpendicularly to the electrical resistances incorporated in the rotor.

The dough reservoir (in injected plastic material) is normally closed by a valve 157 pivoted on shaft 158 and permanently urged by a spring. By placing the reservoir on the vat, the small tongue 159 bears against the edge of the vat and opens the opening.

Inclined plane 160 of sheet iron covered by a taut sheet of synthetic fibre permits to collect the pancakes outside the machine as these become unstuck.

To make industrial scale machines, the invention calls into play a smooth plate for the first cooking the shape of the pancake being determined by the spreading of dough on a spreading surface before its wiping on the rotor. This paster must be:
- cylindrical and having a raised surface in the shape of the pancake or cylindrical and have been previously covered by a deposit in the shape of the pancake.
  or formed by a rolling belt having a surface in the shape of the pancake, one of the stretching rollers being placed above a constant level vat in order that the shape become covered with dough, the other spreader being placed against the heating plate in order that the deposit of dough be transposed thereon.

The hot plate for the first stage of the cooking can assume various shapes such as for example:
- cylindrical (spreading of dough by roller and carpet);
- revolving table;
- flat plate along the rolling path;
- steel band;
- flat and fixed, the paster moving thereabove with a alternating rectilinear movement or continuous circular movement.

The schematic diagrams of the various types of spreading are represented by way of nonlimiting example.

One embodiment involving a paster having a band for pasting a smooth cylinder is described below.

FIG. 18 shows in perspective view the spreader on a large scale production machine having a heating cylinder and wherein dough is spread by a carpet.

Figure 1:
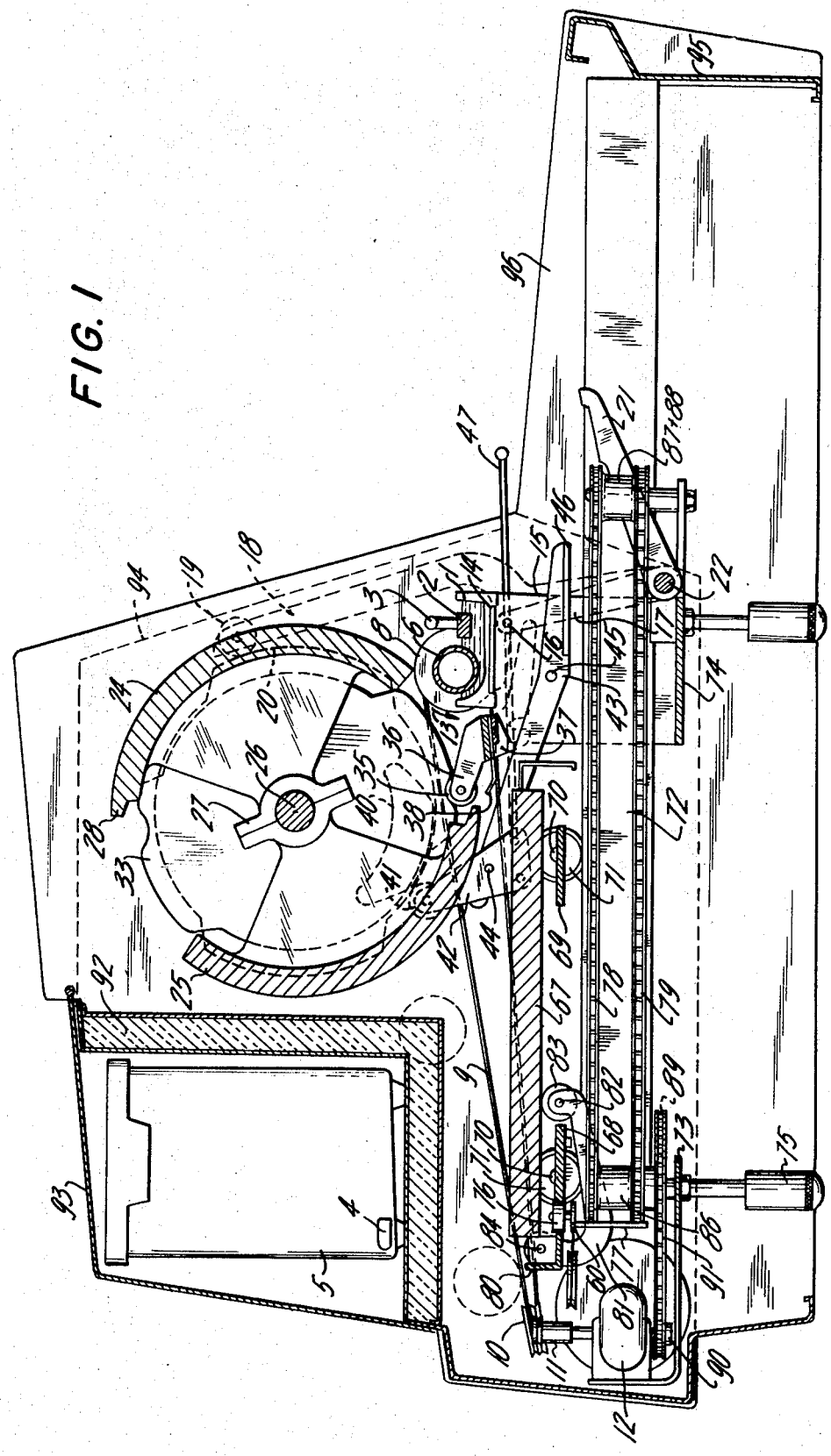
Figure 2:
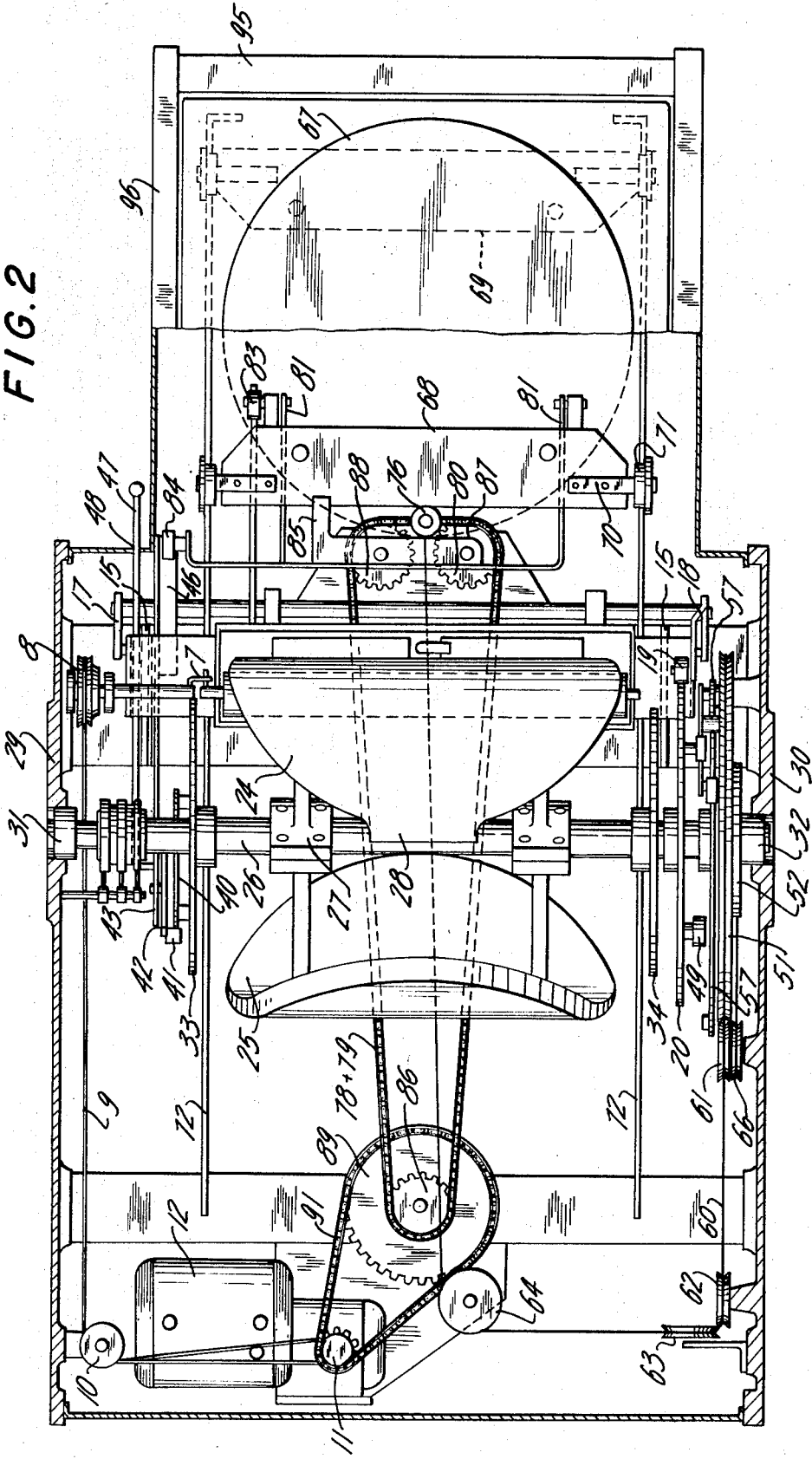
Figure 3:
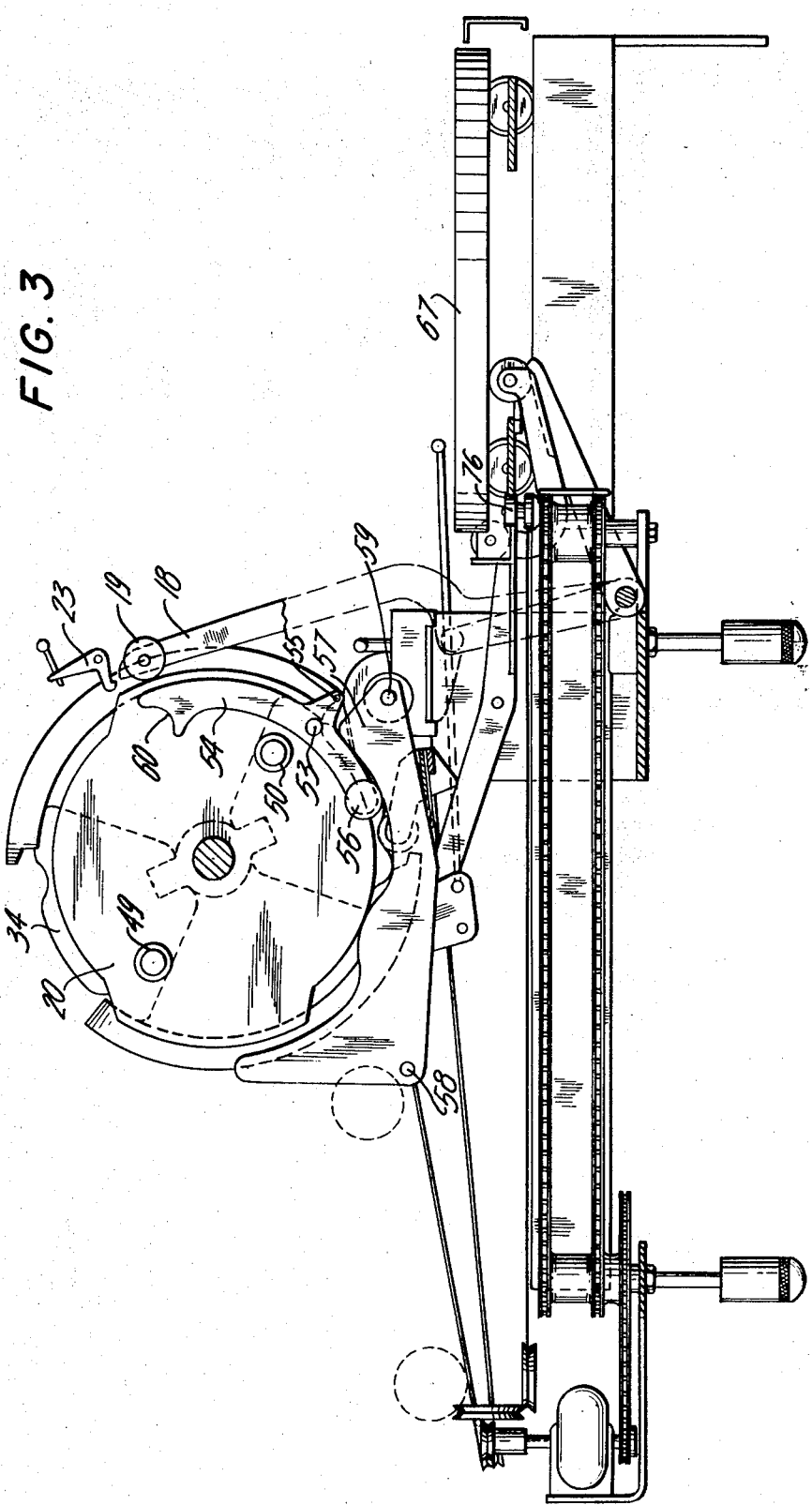
Figure 4:
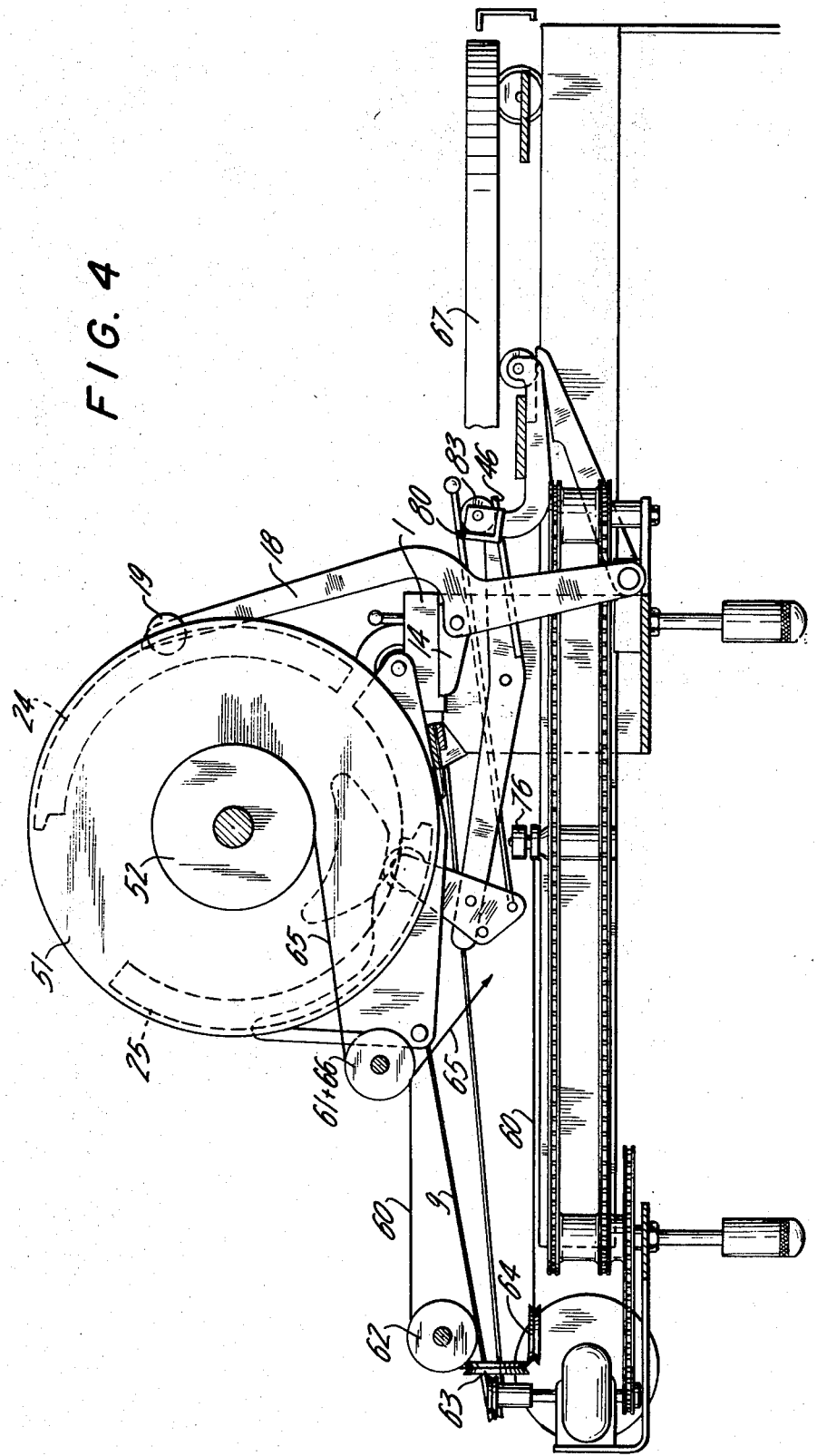
Figure 5:
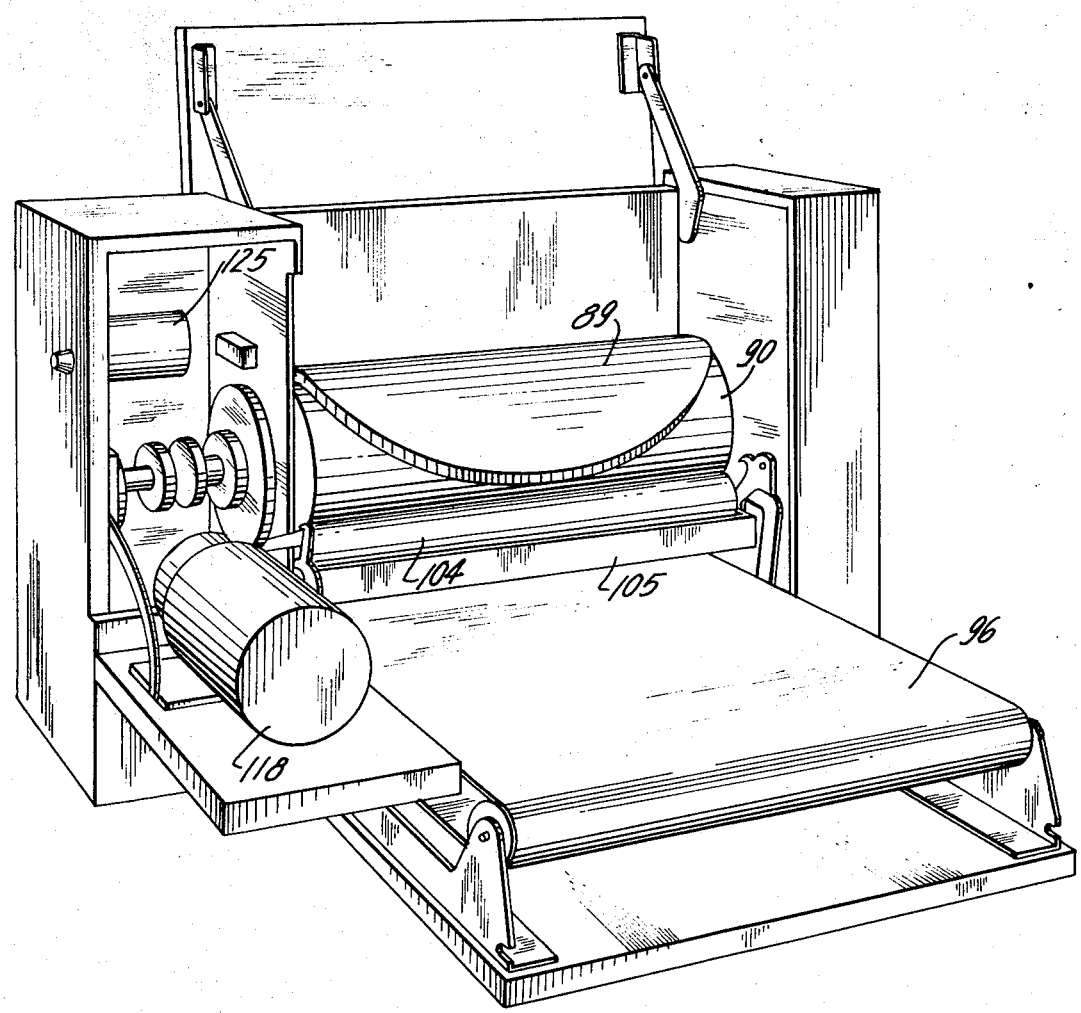
Figure 15:
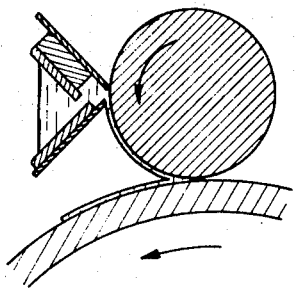
FIG. 15 shows schematically a smooth, cylindrical, pasting roller on which is disposed a pouring hopper the width of whose slot allows the flowing of a layer of dough in the shape of the pancake, form drawn by the dough as the roller rotates, and through the adjustable opening of the pouring slot.
Figure 17:
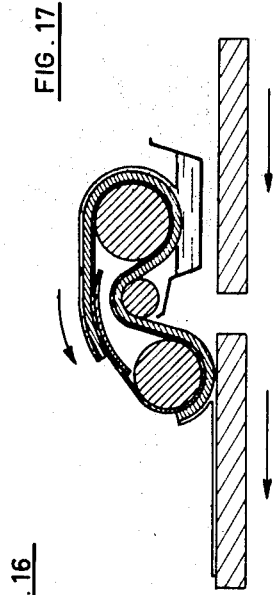
FIG. 17 shows schematically an endless belt spreader the surface of which has a raised surface and intended for the placing of dough on a plate passing under the vat of dough.
Figure 14:
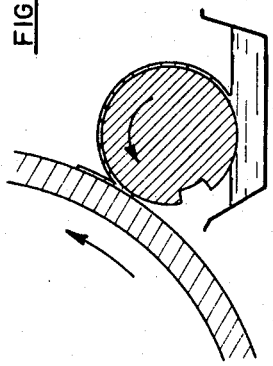
FIG. 14 shows schematically a cylindrical pasting roller having a raised surface for spreading dough on a heating cylinder.
Figure 16:
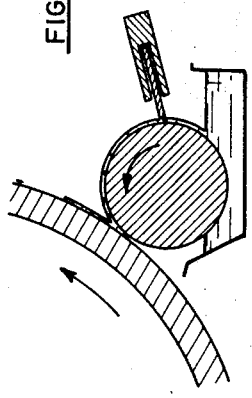
FIG. 16 shows schematically a smooth pasting roller dipping in a vat of dough in which the shape of the dough to be deposited on the hot plate is designed by scraping. The scrapers are movable along the generatrices of the roller and move in order that their extremities draw a round or elliptical shape on the surface of the roller.

Cylinder 161 is in cast iron rotating in the direction indicated by the arrow equipped with trunnions 162 resting on rollers not shown, is heated by gas jets placed against the inner surface and passing through hollows in the trunnions.

A cutting steel blade 163 is positioned in the lower part of the cylinder.

An elliptical shape 164 of flexible rubber is glued on an endless belt 165 of rubberized cloth.

The major axis of the ellipse coincides with the rolling axis of the belt. Two rollers 166 and 167 mounted on watertight ball bearings encased in rapidly removable fashion on frame 168 stretch carpet 165. This frame supports a reducing motor 169 driving through handle 170 roller 167. It supports additionally a vat 171 containing dough 172 at a level maintained constant by an auxiliary device and fed through flexible rubber tube 173. It is mounted on two slides not shown and secured by threaded rods 174 which also serve to a fine adjustment of the position of shape 164 relative to cooking cylinders 161.

Belt 165 moves in the direction of the arrow. It is positioned in such a manner that the surface of form 164 passes very close at some tenths of millimeters from the surface of cylinder 161. The ratio of tangential speed of cylinder 161 to the tangential speed of form 164 must be substantially the same as the ratio of the axes of the ellipse constituting form 164 in order that the deposit on the cylinder be round. This arrangement is necessary owing to the fact that there must be a slight excess of dough on the exchange line. It is evident that by placing a round form the speed ratio must be equal to one rotation in order to obtain the deposit of a new rounded shape on the cylinder without excess of dough on the line of exchange.

The surface of form 164 touches permanently surface 172 and becomes covered with a layer of dough which is brought by the movement of the carpet against cylinder 161 in order to form a deposit 175 which after a certain rotational angle of 161 will be scraped after cooking by blade 163 to be deposited either:
   a. on a rolling removing carpet if cooking is effected on only one surface.
   b. on a second heating cylinder, on a heated steel band, on a rotating heated cast iron table disposed in such a manner that the radius vectors correspond with the genetrix of unsticking on heating plates moving linearly or circularly or under any other means which are suitable for cooking the other side.
   c. the second cooking can also be made by exposing to infrared rays during the end of stay on the first cylinder.

Additionally it is possible in order that the pancakes be connected and linked one to the other, for example in order not to slide along the surface of the second cooking cylinder, or facilitate operations of removal or folding, to prolong the extremities of the ellipse by a narrow band of the same height of the raised surface, this in order that the deposit of dough, perpendicular to the unrolling axis of the carpet be a continuous surface.

Finally, the arrangement for the rapid removal of the paster carpet permits to replace it instantaneously by other carpets having smaller or larger forms for the pancakes or any forms whatsoever, it being only necessary to adjust the speed of passage.

To make an industrial scale machine having a band, the invention requires the same rollers as those previously described, but in order to produce new products, in the shape of bands, similar to the pancake owing to the composition of the doughs (wheat dough, buck wheat, corn, rice, or cereal flour). These bands can be intended to be rolled, folded, stuffed by suitable stuffing, or enter into cooked, precooked, freshly delivered or frozen foods.

In accordance with the invention, a machine for making a band of pancake dough comprises a paster, constituted on a series of cylindrical surfaces rigid with a same shaft dipping in a vat of dough having a constant level and continuously spreading several bands of dough on a smooth surface cylinder. After unsticking, these bands of dough are cooked on their other side on a second smooth cylinder, after being removed from the machine by a turning band.

FIG. 19 shows a perspective view of the main part of the machine.

Vat 175, fed through flexible tube 176, is maintained at a constant dough level by means of an auxiliary device. Roller 177 constituted of three juxtaposed cylindrical parts separated by a slight interval, permanently dips in the dough and is connected to reducing motor 178. The assembly is maintained in a frame of folded sheet metal and positioned in a precise manner by means of adjusting screws in order to adjust the position of the pasting roller relative to cylinder 179. This latter of cast iron is heated inside by gas jets. A second cylinder 180, placed under the first, is heated similarly. Both are rotated in the direction of the arrows.

A scraper 181 turning in the opposite direction is mounted under the spreader vat.

A moving bar 182 enables the dough to leave cylinder 180. A travelling band 183 receives the bands of dough and feeds the auxiliary devices for folding, stuffing and cutting.

The bands of dough cook on cylinder 179 on their first side during their stay on the latter, then pass on the second cylinder 180 to have their other side cooked. Scraper 181 permits the unsticking of the bands before complete winding of the second cylinder. The remover bar driven mechanically by the transmissions of the cylinders has a tangential speed slightly superior thereto, in such a way that the band wound on the second cylinder be applied thereagainst permanently. This bar is only necessary for thicker bands of dough. The bands rest then on the endless belt which has a speed equal to the tangential speed of the cylinder.

This assembly encompasses the various pasting and cooking devices previously described in particular and principally:

1. The pasting can be made from an endless belt having raised forms which can be either rectilinear, or various shapes in order that after cutting of the bands the same design be indefinitely reproduced.
2. Cooking can take place on a single cylinder.
3. The second cooking can be made on the same cylinder by exposing to infrared rays or on a steel band.
4. The unsticking taking place naturally without the aid of a scraping, a design or an inscription can be engraved on the first cylinder in order that the bands of dough have a characteristic trade mark or trade name thereon;
5. The continuity of the pasting can be periodically interrupted in order to obtain bands of a certain length. It suffices for this to have a cam mechanically associated to the rotation of the cylinder and which temporarily pushes back the assembly of the roller and the vat.

As above described, the thickness of the dough deposit is proportional to the difference of tangential speed with which the heating cylinder and the pasting roller are driven. The thickness of the deposit is thus adjustable at will by varying the speed of the reducing motor driving the pasting cylinder.

Without departing from the framework of the present invention, the different pasting systems and particularly the latter can be adapted to other manufactures than those of bands of dough made of cereal flour.

In effect, all products to be cooked or dried, in the form of thin deposits can be made according to these principles.

The same is true for papers, soft cardboards, nonwoven textiles, where fibres suspended in water are actually deposited by other methods on heating cylinders.

The same is true with the coating of certain materials such as the coating of felts with bituminous products, plastic films, textiles, glues, paints, varnishes, etc., or bands of metallic sheets for coatings. Products dehydrated by heat such as milk can be spread on cylinders according to the same principle.

The application of the invention to the making of an industrial machine having a lip spreader puts into operation a cylinder on which are engraved in relief the shapes of pancakes mutually connected by a raised tail of the same height. These forms come to lick the level of the paste overflowing the lips of the reservoir placed under the rotor. The exact quantity of dough is sent to the said reservoir by means of a pump the flow of which is at every moment proportional to the surface undergoing licking. It goes without saying that for a round pancake the output curve is sinusoidal and the movement of the piston of the pump is controlled by a simple system of crank pin rod.

After scraping, the band formed by the pancakes held to one another by their tail can be deposited on any system already described in particular on a second smooth heating cylinder.

FIG. 20 shows the lip vat in perspective cut in the forward part.

The reservoir itself 184 consists of a stainless steel section welded at its extremities 185 to a stainless steel sheet folded in such a way that the latter forms a hollow body 186 in which flows a small trickle of water.

Lips 187 are formed by welding the sheets and straightening and are coated with silicone in order that the level of dough 188 fed by tube 189 can by surface tension form an overlapping wad at the level of the lips. It is this wad constantly upkept by suitable feeding in dough which will be touched by the engraved shapes on the cooking cylinder located above the spreader. It should be noted that the pancake dough adheres immediately to a surface brought to the cooking temperature. The two channels 190 and 191 sloping towards one of the extremities of the paster permit to recover the unwanted overflows of dough which may occur in particular during adjustment of the flow, flow which is proportional to the quantity of dough remaining adherent to the cooking surfaces, this quantity being proportional to the cooking temperature and fluidity of the dough.

The pancake-making machines object of the present invention have numerous advantages in particular:

1. elimination of skilled labour;
2. elimination and volumetric uniformity of the product, and accordingly uniformity of quality; and according to the type of machine considered
3. rapidity of placing into operation in industrial or household scale; and
4. possibility of high speed production without altering the quality and provision of new products.

We claim:

1. Machine for making flat, cooked, food products, such as pancakes and the like, comprising a dough dispensing device, a container in which dough is maintained at a substantially constant level, said dough dispensing device being movable relative to said container and having at least one surface dipping into said container; at least one rotatable heating plate of cylindrical configuration positioned near said dough dispensing device in such a way that by virtue of the relative movement of the dough dispensing device and that of the plate, a part of the dough covering said dispensing device deposits on said heating plate to form said food product, and means for removing said food product and means for receiving the removed food product.

2. Machine according to claim 1, wherein said dough dispensing device and said heating plate are rotatable in the same direction.

3. Machine according to claim 1, wherein said dough dispensing device and said heating plate are rotatable in the opposite direction.

4. Machine according to claim 1, including a channel for feeding dough to said container, said channel having a closure and a float controlled device actuating said closure, thereby maintaining the level of the dough constant.

5. Machine according to claim 1, having a trough-shaped reservoir for maintaining the level of dough constant.

6. Machine according to claim 1 wherein the maintenance of a constant level of the dough is ensured by gravity fill.

7. Machine according to claim 1 having at least one curved heating plate along a cylinder and a shape adapted to that desired for the final product, the rotation of said plate being limited to one rotation per cycle.

8. Machine according to claim 1 having at least one rotatable heating cylinder, and shaping means raised thereon for heating the final product, said cylinder being rotatable to the extent of one rotation per cycle.

9. Machine according to claim 8, wherein said shaping means have two extremities connected therebetween by raised surfaces of the same thickness so as to prevent sloping in a central zone of the cylinder.

10. Machine according to claim 8, having tooth shaping means cut in the extremities of the cylinder and acting on the position of a pasting roller and on its rotation.

11. Machine according to claim 1, having a smooth cylinder serving as a cooking surface.

12. Machine according to claim 1, having a single-surfaced heating plate, said dough dispensing device having raised shaping means in such a way that the dough dispensing device can be covered by a layer of dough having the shape of the desired food product before depositing it on the said single surface.

13. Machine according to claim 12, wherein said dough dispensing device consists of an endless belt having shaping means recessed on an augmented section thereof.

14. Machine according to claim 12, having means for shaping the dough to be deposited on a cooking surface, said means consisting of a hopper provided with a slot, said slot having an adjustable length, said length being variable along the three generatrices of the shape of the said food product.

15. Machine according to claim 12 wherein the shape of the dough to be deposited on the said cooking surface is wiped on the dough dispensing device.

16. Machine according to claim 1 having cooking plates movable in a horizontal continuous recurrent movement and consisting of metallic bands or of circular rotating tables.

17. Machine according to claim 1 having a second cooking plate.

18. Machine according to claim 17, having means for cooking by exposing the food product while it is on the first cooking plate.

19. Machine according to claim 1, having means for transporting the food product in order to subject it to additional treatment whereby it undergoes all desired molecular changes.